United States Patent
Benjamin et al.

(10) Patent No.: US 11,025,612 B2
(45) Date of Patent: *Jun. 1, 2021

(54) INTELLIGENT CERTIFICATE DISCOVERY IN PHYSICAL AND VIRTUALIZED NETWORKS

(71) Applicant: Edison Vault, LLC, Wilmington, DE (US)

(72) Inventors: Thomas H. Benjamin, Cedar Park, TX (US); Steven E. T. Hikida, Markham (CA); John T. Peck, Liberty Hill, TX (US); Bruce A. Rich, Cedar Park, TX (US); Richard L. Robinson, Broomfield, CO (US)

(*) Notice: Subject to any disclaimer, the term of this patent is extended or adjusted under 35 U.S.C. 154(b) by 57 days.

This patent is subject to a terminal disclaimer.

(21) Appl. No.: 16/403,778

(22) Filed: May 6, 2019

(65) Prior Publication Data
US 2019/0260735 A1    Aug. 22, 2019

Related U.S. Application Data

(63) Continuation of application No. 14/832,250, filed on Aug. 21, 2015, now Pat. No. 10,284,542.

(51) Int. Cl.
*H04L 29/06*    (2006.01)
(52) U.S. Cl.
CPC ...... *H04L 63/0823* (2013.01); *H04L 63/1408* (2013.01)
(58) Field of Classification Search
None
See application file for complete search history.

(56) References Cited

U.S. PATENT DOCUMENTS

| 6,351,812 B1 | 2/2002 | Datar et al. |
| 8,380,259 B2 | 2/2013 | Jain et al. |
| 8,584,215 B2 | 11/2013 | Narasimha et al. |

(Continued)

FOREIGN PATENT DOCUMENTS

EP    1267516 A2    12/2002

OTHER PUBLICATIONS

"List of IBM Patents or Patent Applications Treated as Related", May 6, 2019, 2 Pages.

(Continued)

*Primary Examiner* — Kambiz Zand
*Assistant Examiner* — Arezoo Sherkat
(74) *Attorney, Agent, or Firm* — Dorsey & Whitney LLP (57) ABSTRACT

Mechanisms are provided, in a communication device associated with a first computing device, for capturing security data exchanged between the first computing device and a second computing device. The mechanisms receive a data message from either the first computing device or the second computing device. The data message is part of an operation for establishing a secure communication connection between the first computing device and the second computing device. The mechanisms filter the received data message for security data passed in the received data message and mirror the security data to an analysis port of the communication device. Moreover, the mechanisms output, via the analysis port, the security data to a data collection and analysis system that analyzes the security data with regard to security requirement compliance.

18 Claims, 5 Drawing Sheets

(56) References Cited

U.S. PATENT DOCUMENTS

| | | | |
|---|---|---|---|
| 8,683,052 B1* | 3/2014 | Brinskelle | H04L 63/1433 709/228 |
| 8,793,361 B1 | 7/2014 | Riddle | |
| 8,813,189 B2 | 8/2014 | Li et al. | |
| 8,856,869 B1 | 10/2014 | Brinskelle | |
| 8,935,525 B2 | 1/2015 | Xiao | |
| 9,338,147 B1 | 5/2016 | Rothstein | |
| 2004/0054885 A1* | 3/2004 | Bartram | H04L 67/104 713/152 |
| 2004/0181665 A1 | 9/2004 | Houser | |
| 2008/0175245 A1 | 7/2008 | Beam et al. | |
| 2009/0300762 A1 | 12/2009 | Yalakanti | |
| 2009/0328194 A1 | 12/2009 | Kim et al. | |
| 2012/0002679 A1* | 1/2012 | Kenigsberg | H04L 63/1441 370/419 |
| 2013/0191628 A1 | 7/2013 | Nedeltchev | |
| 2014/0196108 A1* | 7/2014 | Barr | H04L 63/205 726/1 |
| 2014/0269777 A1* | 9/2014 | Rothstein | H04L 63/0428 370/503 |
| 2014/0280889 A1 | 9/2014 | Nispel et al. | |
| 2016/0119374 A1 | 4/2016 | Williams et al. | |
| 2017/0026186 A1 | 1/2017 | Gu | |

OTHER PUBLICATIONS

"High Performance Browser Networking: Chapter 4. Transport Layer Security (TLS)", O'Reilly Media, Inc., http://chimera.labs.oreilly.com/books/1230000000545/ch04.html#TLS_HAND-SHAKE, accessed on the internet on Jun. 3, 2015, 14 Pages.

Singh, Shashank, "Catalyst Switched Port Analyzer (SPAN) Configuration Example", Cisco, Document ID: 10570, Apr. 21, 2014; accessed on the internet on Aug. 20, 2015; http://www.cisco.com/c/en/us/support/docs/switches/catalyst-6500-series-switches/10570-41.pdf, 38 Pages.

Thompson, Mary R. et al., "Certificate-Based Authorization Policy in a PKI Environment", ACM Transactions on Information and System Security, vol. 6, No. 4, Nov. 2003, pp. 566-588.

* cited by examiner

INTELLIGENT CERTIFICATE DISCOVERY IN PHYSICAL AND VIRTUALIZED NETWORKS

BACKGROUND

The present application relates generally to an improved data processing apparatus and method and more specifically to mechanisms for intelligent certificate discovery in physical and virtualized networks.

The modern Internet economy has developed around secure, encrypted transmissions, originally web browser-driven, but now application driven. These secure, encrypted transmissions usually employ Hypertext Transport Protocol (HTTP) over Secure Sockets Layer (SSL) or Transport Layer Security (TLS). Such protocols rely on Public Key Infrastructure (PKI) for the initial exchange of information which leads to a high performance secure connection that shields sensitive private information from unintended parties. PKI in turn relies on an asymmetric key pair association where a public key is exposed to the world through a certificate (usually in X.509 format) issued by a well-known certificate authority. The corresponding private key remains hidden from all other parties except the owner of the private key. The certificate includes information about the public key, information about the identity of the owner of the public key, and a digital signature of an entity that has verified that the contents of the certificate are correct (referred to as the "issuer" of the certificate). In the X.509 format, for example, the certificate includes the following information:

- Serial Number: Used to uniquely identify the certificate
- Subject: The person or entity identified
- Signature Algorithm: The algorithm used to create the signature
- Signature: The actual signature to very that the certificate came from the issuer
- Issuer: The entity that verified the information and issued the certificate
- Valid-From (Not-Before): The date the certificate is first valid from
- Valid-To (Not-After): The expiration date
- Key-Usage: Purpose of the public key (e.g., encipherment, signature, certificate signing, etc.)
- Public Key: The public key
- Public Key Algorithm: The algorithm used to generate the Public Key
- Thumbprint Algorithm: The algorithm used to hash the public key certificate
- Thumbprint (also known as fingerprint): The hash itself, used as an abbreviated form of the public key certificate The strength of this key pair is based partially on the algorithm in which the keys are intended to be used, as well as the length of the keys themselves. Such information is readily available in the certificate along with assertions regarding the appropriate usage of the certificate from the issuing authority, e.g., assertions of "not-valid-before" and "not-valid-after" timestamps, the chain of trust for the issuing authority itself, and the like, as illustrated above with regard to the X.509 format. All such information in the certificate should be examined before a client computing device extends its trust to the server associated with the certificate, or vice versa. However, many client side users and server side commercial applications fail to adequately check this information. Moreover, the National Institute of Standards and Technology (NIST) has published guidelines for the United States of America federal government sector dictating what key sizes and algorithms are permissible for usage by federal installations. Similar restrictions apply in the commercial sector as well, whether by companies voluntarily adhering to the NIST guidelines or being forced by compliance requirements from regulating bodies, such as Health Insurance Portability and Accountability (HIPPA) or Peripheral Component Interconnect/Data Security Standard (PCI/DSS) regulating bodies, among others.

SUMMARY

In one illustrative embodiment, a method is provided, in a communication device associated with a first computing device, for capturing security data exchanged between the first computing device and a second computing device. The method comprises receiving, in the communication device, a data message from either the first computing device or the second computing device. The data message is part of an operation for establishing a secure communication connection between the first computing device and the second computing device. The method further comprises filtering, by the communication device, the received data message for security data passed in the received data message and mirroring, by the communication device, the security data to an analysis port of the communication device. Moreover, the method comprises outputting, by the communication device, via the analysis port, the security data to a data collection and analysis system that analyzes the security data with regard to security requirement compliance.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for intelligent certificate discovery in physical and virtualized networks. As noted above, various standards requirements have been placed on institutions to ensure security of their electronic communications. Given the need for compliance with these established standards, various products have been devised to probe an installation's infrastructure so that a company can prove such compliance to auditors. Such products usually present themselves as TLS clients, attempting handshakes with specified hosts computing systems on particular ports. This process is very intrusive and may require reconfiguration every time a new service comes online or the network topology of the infrastructure changes. If the installation also has network monitoring software/intrusion protection systems that detect attempted break-ins, and most do have such systems, this intrusive client-initiated TLS probing will set off the alarms and protections provided by these networking monitoring software/intrusion protection systems as such intrusions look suspiciously like a port-scan attack.

The illustrative embodiments provide a non-intrusive security monitoring solution that does not require active probing of an institution's networked machines or ongoing modifications to maintain the monitoring capabilities. The mechanisms of the illustrative embodiments implement data capture via an analysis port on switches of the network infrastructure. The analysis port may be physical or virtualized such that the non-invasive security data capturing and analysis mechanisms of the illustrative embodiments may be used with physical and virtualized networks. The data that is captured is the security data, e.g., Public Key Infrastructure (PKI) data, Secure Shell (SSH) data, or the like, from handshake communications between two computing devices. Typically, this data may be provided in the form of a certificate, but the illustrative embodiments are not limited to only operation with certificates and may operate with regard to any identifiable security data passed as part of a handshake or connection initiation communication. This security data may comprise, for example, key lengths, signature types, and algorithms, all of which are passed "in the clear," i.e. without encryption, between the computing devices. This data is filtered out of the other traffic flowing through one or more of the switches of the infrastructure, by logic implemented in the switches, and sent to the analysis port for capturing. The captured data is then stored and may be accessed by an external system for analysis to evaluate proper/improper usage of security standards by the computing devices involved in the communications.

For example, a switch associated with a server may be configured to implement the logic of the illustrative embodiments and may be configured with a physical or virtual analysis port for use with the logic of the illustrative embodiments. The logic of the switch monitors the data traffic (or simply "traffic") flowing through the switch for patterns of data, field values in headers, tags, or any other identifier of handshake communications or communications associated with the establishment of a secure connection (hereafter referred to as a "handshake" communication) between the server and another external computing device (assumed hereafter to be the "client" computing device to the server computing device). The logic of the switch, in response to identifying a data communication flowing through the switch either to, or from, the server, as being a handshake communication, extracts or captures security data in the communication for which analysis is desired.

In the illustrative embodiments described herein, this security data comprises security certificate data, timestamp information associated with the communication from which the security certificate data was obtained, as well as any other suitable information for identifying the source of the communication, the destination of the communication, and the like. This information may be extracted by the logic of the switch after the identified data communications are mirrored to the analysis port, and either stored in a storage device of the switch or otherwise output to an external analysis computing device/system where this information may be stored and analyzed.

In some illustrative embodiments, the analysis that is performed on the captured security data may be categorized into three primary categories: (1) Certificate Usage Trends for Servers and Clients; (2) Risky Certificate Analytics; and (3) security alert Trigger Analytics. With regard to Certificate Usage Trends for Servers and Clients, various analytics may be performed directed to determining the frequency of use of certificates, temporal use patterns including night, daytime, and particular hours of use, most frequently used certificates, duplication of certificates, changes/trends in certificate issuer adoption, and certificate strength. Regarding the Risky Certificate Analytics, various analytics may be performed directed to determining the user of certificates from issuers that have high revocation rates, use of certificates from issuers that have been assigned a low reputation rating, use of certificate mechanisms that have invalid or non-existent revocation checking mechanisms, and overuse, reuse, or sharing of a certificate by multiple entities (client computing devices or servers). With regard to Trigger Analytics, various analytics may be performed directed to determining each use of a client or server certificate that is known to be revoked, each use of a certificate that is from an unauthorized issuer, use or reuse of a client certificate that is self-signed, use of a certificate that has never been seen previously on the network, use of a certificate from a certificate issuer that has never been seen previously on the network, and trusting a certificate from a server outside the enterprise that is using an untrusted, revoked, risky, unauthorized, or weak certificate, i.e. creating a secure tunnel to an external web server to send stolen data.

The analysis is performed by a data collection and analysis system that obtains the security data from the switch, e.g., via the analysis port of the switch. The data collection and analysis system may perform one or more analysis operations to generate a result which is then provided to a compliance auditing system. The compliance auditing system compares the results generated by the data collection and analysis system to a set of compliance requirements to determine if the data communications exchanged with the computing device, e.g., server, meet the compliance requirements or not. The results of this comparison are stored and/or used to generate reports, notifications, or other output to inform an authorized user of the degree of compliance of the computing device with the compliance requirements. While the data collection and analysis system and compliance auditing system are described separately, they may in fact be integrated with one another such that a single system collects the security data from the switch, analyzes it, and compares it to compliance requirements, without departing from the spirit and scope of the illustrative embodiments.

It should be appreciated that these operations of collecting security data from switches, analyzing the collected security data, and comparing the results of the analysis to compliance requirements may be performed for a plurality of computing devices with the results of these operations being aggregated to generate an overall report, notification, or other output that covers the plurality of computing devices. For example, such operations may be performed for computing devices across an enterprise, an entire company, or at least a portion of the enterprise, e.g., a division within a company. As such, the computing devices may be widely distributed and connected via one or more networks with the data collection, analysis, and compliance auditing operations being provided via a centralized computing system. Alternatively, such operations may be distributed to various portions of the enterprise with each performing such operations for their own individual division, optionally with additional centralized collection, analysis, and compliance auditing being done across divisions at a centralized computing system. Any architecture that facilitates the collection of security data from switches in the manner of the illustrative embodiments, analysis of such collected security data, and compliance auditing based on the results of the analysis may be used without departing from the spirit and scope of the illustrative embodiments.

It should be appreciated that the mechanisms of the illustrative embodiments operate on both ingress and egress traffic of a server computing device or client computing device with which the switch is associated. That is, in a client-server connection establishment via handshake operations of a secure communication protocol, the mechanisms of the illustrative embodiments capture the security data, e.g., certificates, of both the client and the server. In known probe based mechanisms, capturing client certificates is not possible, as all the internet architectures work together to protect the clients. For example, all of the secure-exchange protocols (e.g., Transport Layer Security (TLS)) start with the client initiating the sequence without presenting any credentials and the server responding by sending its certificate(s). None of the known secure-exchange protocols allow servers to unilaterally reach out to clients and discover features about them. TCP-based protocols all start with the client issuing a SYN packet to the server, the server responding with an ACK, and the exchange of information following an assertion of the two machines with regard to their respective roles. Furthermore, the Internet is wired to facilitate client-to-server flows, with firewall rules such that servers are accessible and non-servers are not. Such protection even extends through the naming of endpoints and the assignment of internet addresses, where servers will be at predictably-fixed names or static IP addresses and clients get dynamic IP addresses, which are much harder to locate and somewhat shielded from constant attack. All of these protections and protocols are specifically designed such that client certificate capturing is not possible.

To the contrary, the illustrative embodiments, through capturing of the security data as part of the handshake operation, are able to identify the choices of security mechanisms negotiated between the client and the server. This provides a much richer set of data that allows for more nuanced analysis of the cryptographic mechanisms of the secure connections which in turn realizes the enterprise goal of proving full compliance to auditors and evaluators.

In addition, as noted above, temporal information about the negotiation of the secure connection as part of the handshake operation may be captured along with the security data. This temporal information allows for temporal analysis as an additional dimension of data analysis in that the analysis mechanisms will be able to know when certain communication sessions happened as well as being provided with information for determining how many communication sessions occurred over a particular sampling period. All together, the security data, entity information, and temporal information gathered by the mechanisms of the illustrative embodiments in a non-intrusive manner provide a superior data pool on which to perform analysis. As a result, the analysis mechanisms of the illustrative embodiments provide a more thorough and informative analysis than is generally available using known invasive probing mechanisms.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the mechanisms of the illustrative embodiments operate to collect security data from secure connection initiation messages, e.g., handshake messages, exchanged between computing devices. The illustrative embodiments utilize logic provided in one or more switches associated with the computing devices to identify secure connection initiation messages, mirror those messages to an analysis port, and then output the message data to an analysis system. This identification of secure connection initiation messages may be performed with regard to both ingress and egress data flows, e.g., data flows to a server originating from a client computer and data flows originating from the server and flowing to the client computer. The illustrative embodiments further provide mechanisms for analyzing this security data to determine analytics that may then be compared to security compliance requirements to ensure that the computing devices involved in the secure connection are complying with these requirements. Corresponding actions may then be taken, such as generating and outputting reports, generating and outputting notifications, terminating connections, recording additional data for monitoring the connection, or the like.

Figure 1:
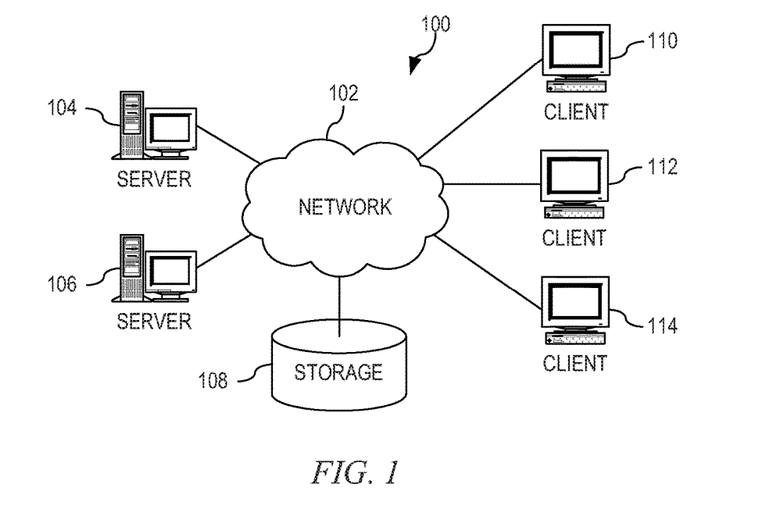
FIG. 1 is an example diagram of a distributed data processing system in which aspects of the illustrative embodiments may be implemented.
Figure 2:
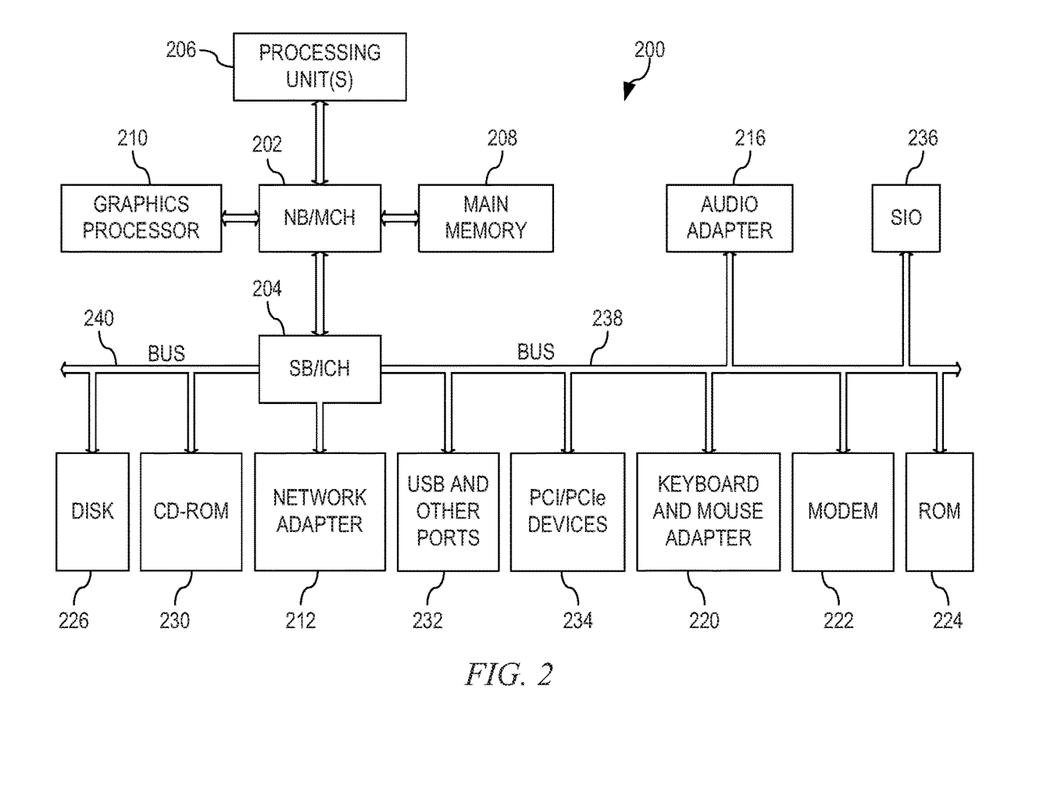
FIG. 2 is an example block diagram of a computing device in which aspects of the illustrative embodiments may be implemented.

Thus, the illustrative embodiments may be utilized in many different types of data processing environments in which multiple computing devices are communicating with one another via secure communication connections. This will typically be a distributed data processing system environment in which one or more data networks are provided, but is not limited to such and any connection between at least two computing devices may utilize the mechanisms of the illustrative embodiments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
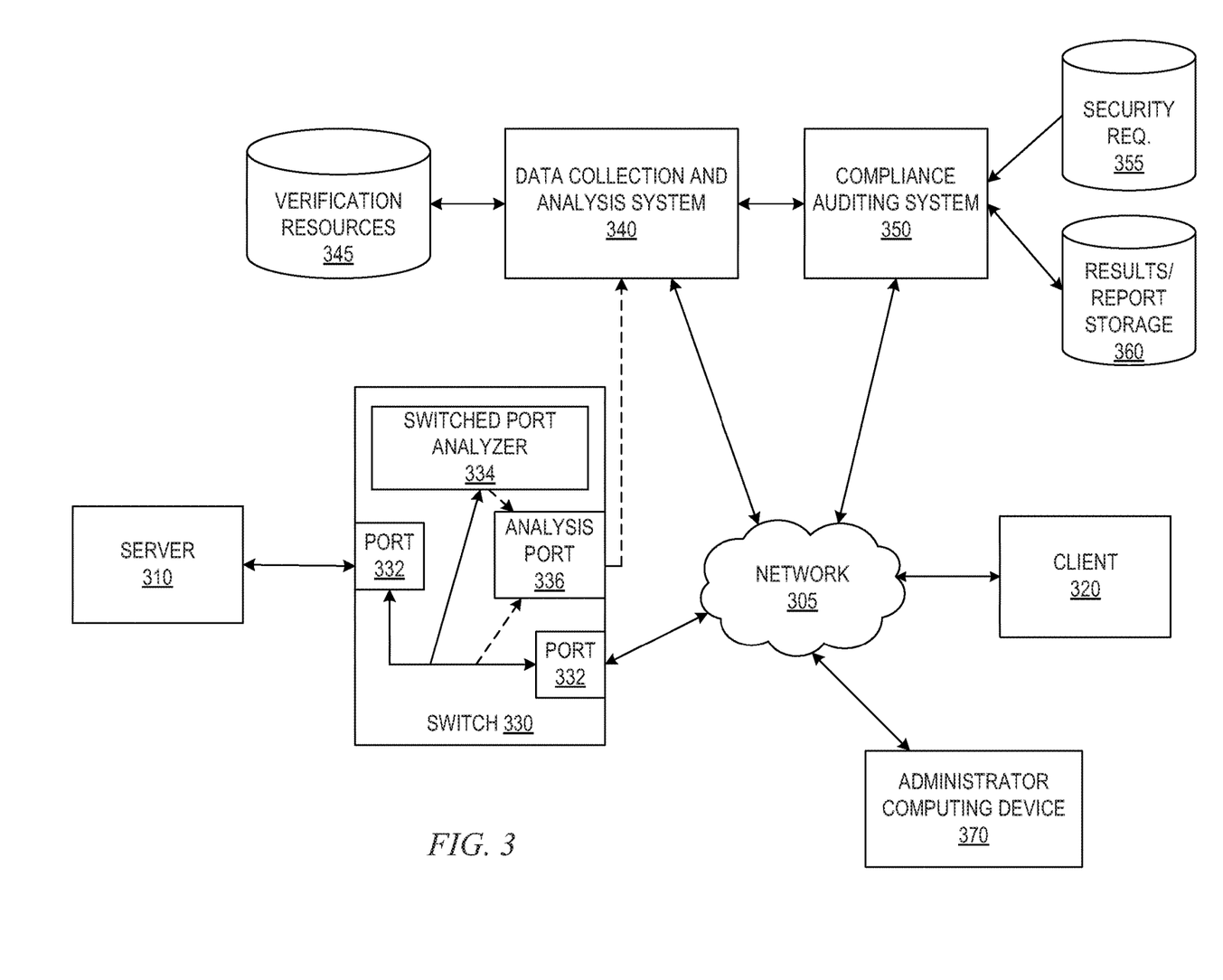
FIG. 3 is an example block diagram of primary operational elements of one example implementation in accordance with one illustrative embodiment.

The illustrative embodiments provide mechanisms for intelligent security data collection and analysis in physical and virtualized networks. In some illustrative embodiments, the security data that is collected comprises security certificate information, source and destination information, temporal information, and the like, obtained from secure connection initiation messages passed between at least two computing devices, e.g., a server and a client computing device. To illustrate the operation of the mechanisms of the illustrative embodiments in further detail, FIG. 3 is provided hereafter which depicts the primary operational components for establishing a secure communication connection and collecting and analyzing security data in accordance with one illustrative embodiment. For purposes of illustration only, it will be assumed in the description of FIG. 3 and subsequent figures that the secure communication connection is between a server and a client computing device and that the secure communication connection is established using a security protocol that requires a handshake operation, e.g., SSL/TLS, in which certificate data is exchanged during the negotiation of the secure communication connection performed via the handshake operation. It should be appreciated that these assumptions are to cover the most prevalent implementations of the mechanisms of the illustrative embodiments, but that other embodiments may utilize different mechanisms for establishment of secure communication connections and the principles and mechanisms of the illustrative embodiments are equally applicable to these other implementations as well.

As shown in FIG. 3, the primary operational components of one implementation of the illustrative embodiments comprises a server 310 and a client 320 communicating with one another via a network 305 and a switch 330. While a switch 330 is shown in FIG. 3, it should be appreciated that the illustrative embodiments are not limited to implementation within a switch 330 by may be implemented in, or operate in conjunction with, other types of network data traffic interface devices including routers, network adapters of computing devices, or any other data traffic interface devices that facilitate the establishment of secure communication connections between a computing device and one or more other computing devices.

As shown in FIG. 3, the switch 330 comprises a plurality of ports 332 for facilitating exchange of data between the server 310, individual applications on the server 310, or the like, and other devices communicatively coupled to the switch 330 via the network 305. The ports 332 may be physical ports of the switch 330 and/or virtualized ports associated with one or more physical ports of the switch 330. Port virtualization is generally known in the art and thus, a more detailed explanation of virtual ports is not provided herein. It should be appreciated that the mechanisms of the illustrative embodiments may be utilized with either or both physical and virtual ports.

In accordance with the mechanisms of the illustrative embodiments, the switch 330 is configured with a switched port analyzer 334 and analysis port 336. The analysis port 336 may be configured to be a port to which security data passed between the ports 332, and identified by the switched port analyzer 334 to be security data for initialization of a secure communication connection, is mirrored. In one illustrative embodiment, the analysis port 336 may be configured in a similar manner to that of a Switch Port Analyzer (SPAN) port or mirror port. In the illustrative embodiments, the analysis port 336 is configured to work in conjunction with the switched port analyzer 334 and receives and processes the data specifically identified by the switched port analyzer 334 for mirroring and output to the data collection and analysis system.

Of particular importance, it should be appreciated that the switched port analyzer 334 of the switch 330 comprises logic for identifying specific types of communications flowing through the switch and identifying particular types of data within these identified communications for mirroring to the analysis port 336. In particular, in some illustrative embodiments, the switched port analyzer 334 analyzes the communications (the terms "communications" and "messages" are used interchangeably herein to refer to data communications exchanged via the switch) flowing through the switch and determines, based on message identifiers, pattern matching, metadata or data packet header information, or any other identifier depending upon the particular protocols utilized, if the communication is part of a negotiation, or handshake, operation for establishing a secure communication connection between two or more computing devices. In one illustrative embodiment, a pattern of exchanged messages may be identified that is indicative of a handshake operation, as will be described in greater detail with regard to FIG. 4 hereafter. If the identified pattern is determined to be present, then the messages may be determined to be part of a handshake operation for initiating a secure communication connection and the switched port analyzer 334 may then monitor for a particular type, or types, of messages that are known within the communication and security protocols to have the security data that the switched port analyzer 334 is to extract and mirror to the analysis port 336, e.g., which messages are likely to have the certificates exchanged between the computing devices with these certificates and corresponding temporal and sender/receiver information being mirrored to the analysis port 336.

For example, assume an example of a TLS session establishment, or handshake operation. According to the IETF RFC that documents the TLS 1.2 protocol, the data packets for exchanging certificates are marked with a HandshakeType of 11. When the server is sending its certificate(s), the switch associated with the client would look for that certificate packet in the data traffic flow between a ServerHello message (packet with HandshakeType of 2) and ServerHelloDone message (packet with HandshakeType of 12). When the client is sending its certificate, the switch associated with the server would look for that certificate packet in the data traffic flow between a ClientHello message (packet with HandshakeType of 1) and the conclusion of the handshake with a Finished message (packet with HandshakeType of 20), followed by the ChangeCipherSpec message.

If the switched port analyzer 334 identifies a communication flowing through the switch 330 that is part of a handshake operation or other negotiation to establish a secure communication connection, the switched port analyzer 334 monitors the messages, identifies the security data to be captured in the messages, and mirrors the captured data to the analysis port 336. As noted above, the security data that is captured is the security data, e.g., Public Key Infrastructure (PKI) data, Secure Shell (SSH) data, or the like, from handshake communications between two computing devices. Typically, this data may be provided in the form of a certificate, such as the example certificate previously mentioned above. Hence, in some illustrative embodiments, the security data that is captured is the certificate data that is exchanged between the two or more computing devices communicating via the switch 330 to establish the secure communication connection. This security data, in the form of a certificate, may comprise information identifying one or more of the key lengths, key algorithms, issuing authority, assertions about appropriate usage of the certificate from the issuing authority, not-valid-before and not-valid-after dates/times, chain of trust for the issuing authority, and the like.

This data is filtered out of the traffic flowing through the switch 330, via ports 332, by the logic of the switched port analyzer 334 and sent or mirrored to the analysis port 336 for capturing by the data collection and analysis system 340. It should be appreciated that this "filtering out" or mirroring of the selected security data does not impede the handshake communications being passed between the server 310 and the client 320 and this information is still permitted to flow in messages exchanged between the server 310 and the client 320. Thus, the filtering or mirroring of this security data is non-intrusive. The identification of the particular security data to mirror comprises identifying a message, in accordance with a known handshake or secure communication connection initiation protocol, that the switched port analyzer 334 is configured to recognize, that stores the certificate or other security data of interest. Based on monitoring of the traffic flows by the switched port analyzer 334, in response to the switched port analyzer 334 identifying such a message as having been received in the switch, the message is analyzed to identify the portion of the message containing the certificate and the certificate is mirrored to the analysis port 336 along with other information about the received message including a timestamp associated with the received message or other temporal information, and information regarding the sender/receiver of the message. In some illustrative embodiments, in accordance with the particular protocols being utilized, the certificate may be provided in a well known position within the identified message and thus, the identification of the certificate is straightforward by extracting the certificate from the known location within the message.

The selected security data, e.g., certificate, timestamp, and sender/receiver identification, are mirrored to the analysis port 336 which sends the captured security data to the data collection and analysis system 340 where the captured security data is stored and able to be accessed by the data collection and analysis system 340 for analysis to evaluate proper/improper usage of security standards by the computing devices involved in the communications. In FIG. 3, the transfer of the capture data is shown as a dashed line connecting the analysis port 336 and the data collection and analysis system 340. It should be appreciated that this transmission of data to the data collection and analysis system 340 may be performed via network 305, for example. Moreover, it should be appreciated that the data collection and analysis system 340 may obtain such captured data from a plurality of different switches 330 associated with different computing devices such analytics can be generated for an aggregate of computing devices in addition to, or alternative to, the analytics generated for a single computing device, e.g., server 310.

The data collection and analysis system 340 stores and/or performs analytical operations on the collected security data from the switch 330 for one or more secure communication connections established through the switch 330, i.e. based on the security data exchanged by the sever 310 and the client 320, and/or other clients (not shown). As noted above, the mechanisms of the illustrative embodiments may be implemented with physical and/or virtual ports and thus, the analysis may also be done with regard to physical and/or virtual ports of the switch. With regard to virtualized ports, it should be appreciated that the analysis may be performed with regard to individual applications associated with the virtualized ports, hosted on the server 310. Thus, the sender/receiver information captured with the certificate information and the temporal information may be used to identify individual applications of the server 310, such as based on virtual port identifier, when performing such analysis operations. In this way, individual compliance of an application to security requirements may be analyzed and corresponding reports, notifications, and operations for termination of connections may be performed on an individual application basis.

The analysis performed by the data collection and analysis system 340 may take many different forms and may be performed on an individual computing device basis, an aggregate of collected security data from a plurality of computing devices, such as across an enterprise or a portion of an enterprise, may be performed on an individual application or set of applications hosted by one or more computing devices, or the like. The analysis performed by the data collection and analysis system 340 preferably provides analytical data and statistics that may be the basis for gauging compliance with one or more security requirements, such as may be specified by one or more security policies. These security policies may be established by the enterprise, required by governmental regulations, or otherwise established.

In some illustrative embodiments, the analysis that is performed on the captured security data may be categorized into three primary categories: (1) Certificate Usage Trends for Servers and Clients; (2) Risky Certificate Analytics; and (3) Trigger Analytics. With regard to Certificate Usage Trends for Servers and Clients, various analytics may be performed directed to determining the frequency of use of certificates, temporal use patterns including night, daytime, and particular hours of use, most frequently used certificates, duplication of certificates, changes/trends in certificate issuer adoption, and certificate strength. Regarding the Risky Certificate Analytics, various analytics may be performed directed to determining the user of certificates from issuers that have high revocation rates, use of certificates from issuers that have been assigned a low reputation rating, use of certificate mechanisms that have invalid or nonexistent revocation checking mechanisms, and overuse, reuse, or sharing of a certificate by multiple entities (client computing devices or servers). With regard to Trigger Analytics, various analytics may be performed directed to determining each use of a client or server certificate that is known to be revoked, each use of a certificate that is from an unauthorized issuer, use or reuse of a client certificate that is self-signed, use of a certificate that has never been seen previously on the network, use of a certificate from a certificate issuer that has never been seen previously on the network, and trusting a certificate from a server outside the enterprise that is using an untrusted, revoked, risky, unauthorized, or weak certificate, i.e. creating a secure tunnel to an external web server to send stolen data.

Analysis directed to determining statistics of frequency of use of certificates may comprise maintaining counters in the data collection and analysis system 340, over a predetermined period of time, for each certificate of how often the certificate is used to create a secure communication connection with the server 310. As noted above, the certificates have unique identifiers and thus, these unique identifiers may be associated with a counter value that is incremented each time the certificate is detected and captured by the switched port analyzer 334. Such counters may be used as well, along with temporal information captured from the communications in which the certificates were also captured, to determine temporal use patterns for the particular certificates. Such information may give insights into potential misuse and exploitation of security lapses by the server 310 to gain access to secure resources of the server 310 at the same or similar periods of time of the day by the same source.

Similarly, such counters may be used to identify the most frequently used certificates and duplication of certificates. Certificates having the highest counter values, or values higher than a given threshold, may be determined to be the most frequently used certificates and may indicate potential intrusion by individuals repeatedly attempting to connect to the server 310. Duplication of certificates may be identified by analyzing the collected security data for those certificates having a counter value greater than 1, and looking at the identification of sender/receiver to determine if the same certificate is being used by more than one sender (client) or receiver (server). A duplicate certificate may be a violation of an established security requirement or policy since such duplicate may be indicative of a misappropriation of the certificate by a user, manager, or administrator within the organization or an intruder attempting to falsify their identity on the network to gain access to servers or networks. Regardless of the reason for the duplication, it is an indication that further investigation is warranted.

With regard to identifying trends in issuer adoption, patterns of collected security data may be analyzed to determine that at a particular time, or at a regular basis, the issuer of certificates is changed from one issuer to another, e.g., from Verisign™ to GoDaddy™. Counters may be established for each issuer, as identified in the captured certificate information, to determine how many certificates issued by the various issuers over a period of time are used to establish communication connections via the switch 330. This information may be compiled for a plurality of time periods such that a trend is discernable through analysis.

Similarly, trends in certificate strength may be identified using counters and temporal information for different types of certificates, such as RSA 2048 and ECC 512, for example. Monitoring such trends allows administrators and managers to assess the overall improvement in strength and consistency of the use of certificates throughout the network as they make changes to policies and enforcement of those policies regarding the use of certificates.

Regarding the identification of risky certificates, the identity of the issuers of certificates captured over the predetermined time period using the switched port analyzer 334 and data collection and analysis system 340 may be used to identify if certificates posing potential risk to the server 310 are being used to access secure resources associated with the server 310. Because the mechanisms of the illustrative embodiments capture the certificates passed as part of the secure connection establishment process, and the certificates include information about the issuer of the certificate, this information may be correlated with issuer information provided by one or more verification resources 345 to verify the status of the issuer and the certificate itself, e.g., revocation rates of issuers, reputation ratings of issuers, certificates that do not have revocation checking mechanisms or invalid revocation checking mechanisms, or the like. That is, services that rate issuers may be used to generate verification resource information 345. The data collection and analysis system 340 may correlate issuer identification information in captured and stored certificate information with these ratings of issuers and determine statistics or analytics as to the number of connections, temporal trends of the connections, and the like, with regard to risky issuers or certificates.

Monitoring these trends allows administrators and managers to demonstrate to auditors that processes have been implemented to not only check for the existence of risky certificates (or certificates from risky issuers) on the network but also to demonstrate improvements in the reduction of the use of risky certificates over time. If the organization is noted for using one or more risky certificates by an auditing entity, a reassessment of the certificates used at a later time should include the monitored trends and show that the occurrence of risky certificates have been reduced. Demonstration of this process to auditors aligns not only with best practices but also the internal and external compliance policies of organizations to have a process, and not just a single measurement, of monitoring security metrics.

Furthermore, with regard to trigger analytics, the trigger is normally triggered whenever the count exceeds 0. In theory, an organization should no longer use certificates that have been revoked or are from unauthorized/risky issuers once they have been identified. In practice, large organizations may inadvertently re-introduce certificates from a risky issuer because of a mistake by an administrator, a change in organizational structure, merging with another organization, or a myriad of other scenarios. Having a triggering system can allow organizations to constantly monitor the network for the existence of revoked (or even risky) certificates. Fundamentally, the definite characteristic of a trigger is when a threshold exceeds zero (or perhaps even some hard threshold that is defined that is greater than zero). One scenario is that a system must continue to use a risky/revoked certificate until it is replaced (perhaps a week or month later), but does not want any more introduced. In this scenario, a threshold of one may be established to allow for the ongoing use of one revoked certificate in the interim, but prevent more revoked certificates from being introduced.

Thus, the data collection and analysis system 340 performs one or more analysis operations to generate a result which is then provided to a compliance auditing system. 350 The compliance auditing system 350 compares the results generated by the data collection and analysis system 340 to a set of security requirements 355 to determine if the data communications exchanged with the computing device, e.g., server, are in compliance with these security requirements or not. The security requirements 355 may be specified as one or more security policies, for example. The security policies may be defined in terms of rules that may be run or applied to the results generated by the data collection and analysis system 340 with compliance results being generated indication whether each rule is satisfied or not by the analysis results generated by the data collection and analysis system 340, for example.

The results of the compliance audit performed by the compliance auditing system 350 are stored in the results/report storage 360 and/or used to generate reports, notifications, or other output to inform an authorized user, such as a user of the administrator computing device 370, of the degree of compliance of the server 310 with the security requirements 355. The notifications or reports may identify violations of security requirements identified by the analytics performed by the data collection and analysis system 340 based on the security data that is captured in a non-invasive manner by the switched port analyzer 334 using the mirroring of identified security data to the analysis port 336.

In some illustrative embodiments, the compliance auditing system 350 may further send commands to the switch 330 and/or server 310, via the network 305, to automatically perform operations to reconfigure the switch 330 and/or server 310 to tear down or block communication connections associated with particular types of clients 320, particular types of security data, e.g., certificates, issuers, or the like. For example, the compliance auditing system 350, determining that a particular issuer that has a low reputation rating is being used to gain access to the resources of the server 310, may issue a command to the switch 330 and/or server 310 to block all future connection requests using a certificate from the particular issuer and a corresponding notification or report may be sent to the administrator computing device 370. Alternatively, the switch 330 may be given commands to restrict, impede, or isolate the traffic on a separate virtual LAN (VLAN) that prevents the traffic from being routed to particular portions of the network or assets within the network. This approach does not block traffic, but protects the remainder of the enterprise network from the traffic protected by a certificate that is in violation of security policy due to its issuer's reputation, its own reputation, revocation status, or risk.

While the data collection and analysis system 340 and compliance auditing system 350 are described separately, they may in fact be integrated with one another such that a single system comprising elements 340-360 (possibly with element 345 being a separate service and security requirements 355 being provided by a separate business policy system) collects the security data from the switch 330, analyzes it, and compares it to compliance requirements, without departing from the spirit and scope of the illustrative embodiments.

Moreover, it should be appreciated that these operations of collecting security data from switches 330, analyzing the collected security data, and comparing the results of the analysis to security requirements 355 for determination of compliance may be performed for a plurality of computing devices with the results of these operations being aggregated to generate an overall report, notification, or other output, e.g., automated commands for reconfiguration of computing devices and switches, that covers the plurality of computing devices. For example, such operations may be performed for computing devices across an enterprise, e.g., an entire company, or at least a portion of the enterprise, e.g., a division within a company. Alternatively, such operations may be distributed to various portions of the enterprise with each performing such operations for their own individual division, optionally with additional centralized collection, analysis, and compliance auditing being done across divisions at a centralized computing system. That is, there may be separate data collection and analysis systems 340 and compliance auditing systems 350 for different portions of an overall enterprise. As noted above, any architecture that facilitates the collection of security data from switches in the manner of the illustrative embodiments, analysis of such collected security data, and compliance auditing based on the results of the analysis may be used without departing from the spirit and scope of the illustrative embodiments.

As mentioned above, the mechanisms of the switched port analyzer 334 monitors traffic flowing through the switch 330 to identify messages being passed as part of a handshake or secure connection establishment operation. Such operations typically follow a well defined pattern of message passing according to the particular protocol being utilized. Thus, the switched port analyzer 334 may monitor the messages being passed between the same two or more computing devices and compare those messages to the established pattern for the protocol being utilized. If the pattern of messages passing between those computing devices matches the pattern known to be associated with the establishment of a secure connection, such as via a handshake operation, then the switched port analyzer 334 may trigger monitoring for particular types of messages known to include security data of interest, e.g., certificates of the sender (client) and receiver (server). Once those messages are identified, the corresponding security data may be extracted and mirrored to the analysis port 336 based on a known location of the security data within the message.

Figure 4:
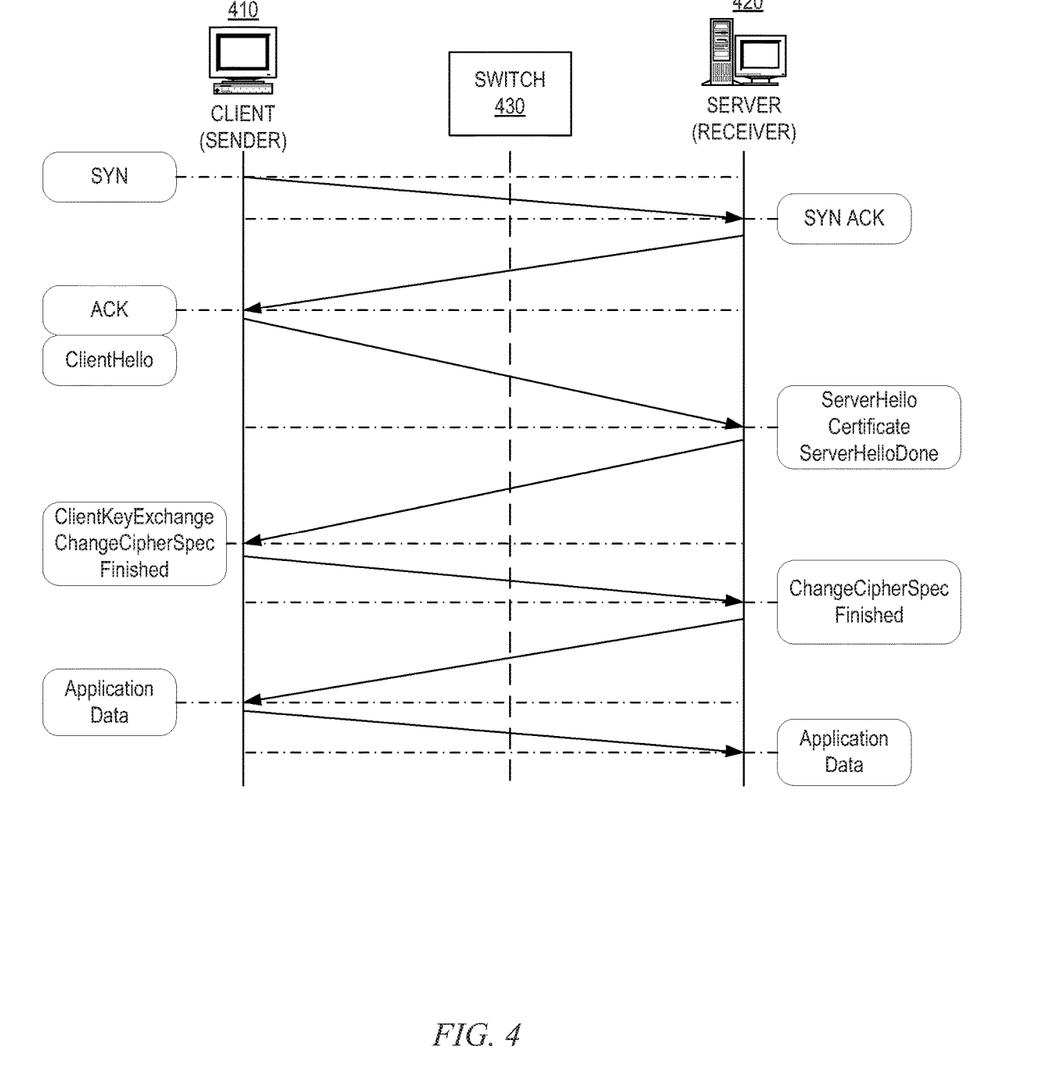
FIG. 4 is an example diagram of a handshake operation in accordance with the TLS protocol.

FIG. 4 illustrates one example of a handshake operation in accordance with the TLS protocol. As shown in FIG. 4, the TLS protocol involves the client (sender) 410 sending a synchronization message (SYN) to the server (receiver) 420 and the receiver 420 sending an acknowledgement back to the sender 410. The sender 410 then sends an acknowledgement and a "ClientHello" message back to the receiver 420. This is a pattern of messaging that may be identified by the switched port analyzer of the switch 430 as the messages flow through the switch. Having identified the pattern as being present, the switch 430 may then monitor the exchange of messages between the sender 410 and the receiver 420 for a "ServerHello" message which includes the server's certificate. If the switch 430 sees this message flowing through the switch 430, then the switch 430 may extract the certificate from the message and mirror it to the analysis port for output to the data collection and analysis system.

Figure 5:
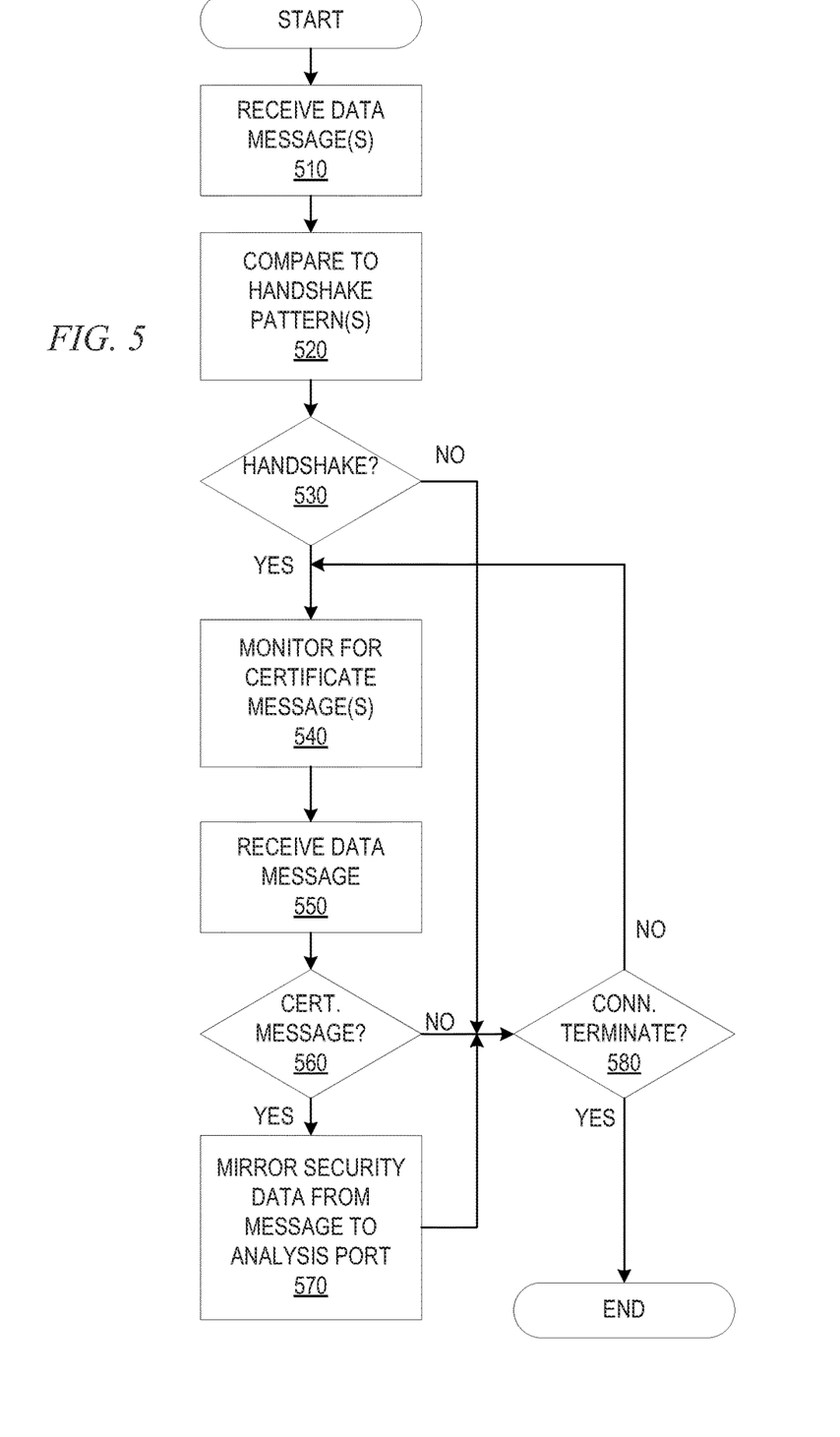
FIG. 5 is a flowchart outlining an example operation of a switched port analyzer in a switch in accordance with one illustrative embodiment.

FIG. 5 is a flowchart outlining an example operation of a switched port analyzer in a switch in accordance with one illustrative embodiment. As shown in FIG. 5, the operation starts with the receiving of data message(s) in the switch via one or more physical and/or virtual ports which are monitored by the switched port analyzer (step 510). The data message(s), or pattern of data message(s), are compared to known handshake message patterns, or otherwise analyzed for identifiers of the messages being part of a handshake operation, e.g., header data, metadata, or message type information indicating the message to be a handshake data message (step 520). A determination is made as to whether there is a handshake operation being performed between the two or more computing devices identified in the data messages (step 530). If not, the operation continues to step 580. If there is a handshake operation being performed, then monitoring for certificate, or other security data, messages is performed (step 540). A data message is then received (step 550) and analyzed to determine if it is a certificate message, i.e. a message of the type known to include a certificate of the sender/receiver (step 560). If so, then the security data, which may include the certificate, timestamp information, identifier of the sender/receiver, and the like, is mirrored from the identified certificate message to the analysis port (step 570). Thereafter, if it is not a certificate message, or if no handshake operation is being performed (step 530: NO), then a determination is made as to whether the connection has been terminated (step 580). If not, the operation returns to step 540 and continues to monitor for certificate messages. Otherwise the operation terminates.

Figure 6:
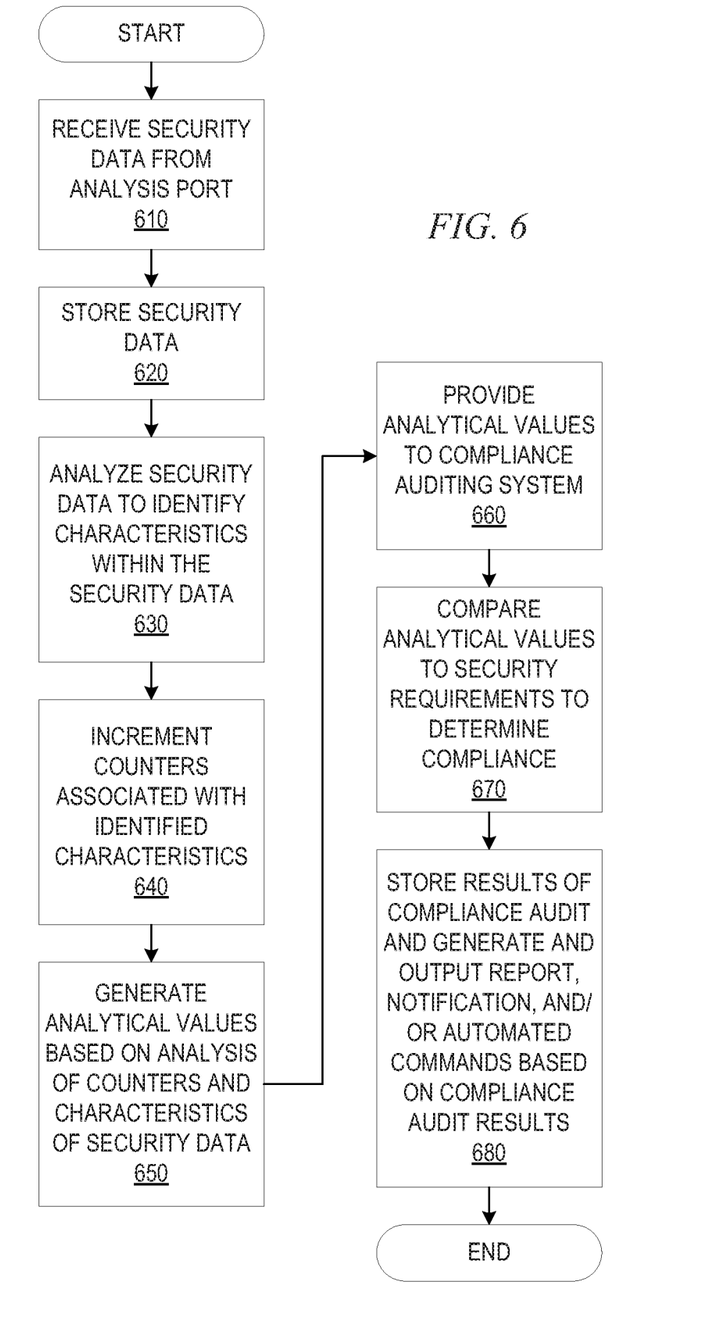
FIG. 6 is a flowchart of a system for collecting security data from an analysis port of a switch and determining compliance of a computing system based on the collected security data in accordance with one illustrative embodiment.

FIG. 6 is a flowchart of a system for collecting security data from an analysis port of a switch and determining compliance of a computing system based on the collected security data in accordance with one illustrative embodiment. As shown in FIG. 6, the operation starts with the receipt of security data from an analysis port of a switch (step 610). The security data is stored (step 620) and later analyzed to identify characteristics within the security data, e.g., the certificate, timestamp, identifiers of sender/receiver, information stored within the certificate, and the like (step 630). Counters associated with the identified characteristics are incremented in accordance with the types of metrics measured by the counters (step 640) and analytical values are generated based on an analysis of the counters and the characteristics of the security data (step 650). The analytical values are provided to the compliance auditing system (step 660) which compares the analytical values to security requirements to determine compliance (step 670). The results of the compliance auditing are stored and appropriate reports, notifications, and automated commands are generated and output based on the compliance audit reports (step 680). The operation then terminates.

It can be seen from the above, that the illustrative embodiments provide a non-intrusive security monitoring solution that does not require active probing of an institution's networked machines or ongoing modifications to maintain the monitoring capabilities. The mechanisms of the illustrative embodiments provide for passive monitoring of flows through switches or other routing/communication devices between computing devices for identifiable patterns of messages and security data. In response to identifying such message and security data, the mechanisms of the illustrative embodiments mirror the desired security data to an analysis port which outputs the captured security data to a data collection and analysis system. In this way, the flows through the switch are not impeded and yet necessary security data for measuring compliance with security requirements is obtained. Various analyses may then be performed on the captured security data and application of security requirements may be performed on the results of the analyses to determine compliance with security requirements.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a switch device associated with a first computing device, for capturing security data exchanged between the first computing device and a second computing device, the method comprising:

receiving, in a first port of the switch device, a data message from either the first computing device or the second computing device to be passed from the first port of the switch device to a second port of the switch device;

filtering, by a switched port analyzer in the switch device, the received data message to identify security certificate data passed in the received data message, wherein filtering the received data message comprises extracting the security certificate data from the received data message, wherein the extracted security certificate data comprises an unencrypted security certificate, and wherein the unencrypted security certificate is a security certificate of the second computing device passed in the received data message as part of a traffic flow from the second computing device to the first computing device;

mirroring, by the switch device switched port analyzer, the extracted security certificate data to an analysis port of the switch device;
outputting, by the switch device via the analysis port, the extracted security certificate data to a data collection and analysis system that
analyzes the extracted security certificate data with regard to security requirement compliance; and
determines whether or not one or more security compliance requirements are met by a secure communication connection.

2. The method of claim 1, wherein the analysis port is one of a physical port of the switch device or a virtualized port of the switch device.

3. The method of claim 1, wherein filtering the received data message comprises analyzing a traffic flow of data traffic through the switch device by implementing logic to identify patterns of data messages passed between the first computing device and the second computing device, field values in headers of data messages in the traffic flow, tags in data messages in the traffic flow, or communication identifiers corresponding to types of communications used to establish secure communication connections; and
identifying the received data message as a message that is part of the operation for establishing a secure communication connection based on results of analyzing the traffic flow of data traffic through the switch device.

4. The method of claim 1, wherein the switch device is physically coupled to one of the first computing device or the second computing device.

5. The method of claim 1, wherein the first computing device is a server computing device and the second computing device is a client computing device.

6. The method of claim 5, wherein the received data message is part of an ingress traffic flow from the client computing device to the server computing device.

7. The method of claim 5, wherein the received data message is part of one of an ingress traffic flow from the client computing device to the server computing device or an egress traffic flow from the server computing device to the client computing device, and wherein the switch device monitors both ingress traffic flows and egress traffic flows for data messages having security certificate data.

8. The method of claim 1, wherein the security certificate data comprises an unencrypted security certificate, a timestamp associated with the received data message, and information regarding a sender or receiver of the received data message.

9. The method of claim 1, further comprising: analyzing, by the data collection and analysis system, the security certificate data to identify at least one of certificate usage trends, risky certificate analytics, or security alert trigger analytics; and comparing results of the analysis with the one or more security compliance requirements.

10. A computer program product comprising a computer readable storage medium having a computer readable program stored therein, wherein the computer readable program, when executed on a switch device, causes the switch device to:
receive, in a first port of the switch device, a data message from either a first computing device or a second computing device to be passed from the first port of the switch device to a second port of the switch device;
filter, by a switched port analyzer in the switch device, the received data message to identify security certificate data passed in the received data message, wherein filtering the received data message comprises extracting the security certificate data from the received data message, wherein the extracted security certificate data comprises an unencrypted security certificate, and wherein the unencrypted security certificate is a security certificate of the second computing device passed in the received data message as part of a traffic flow from the second computing device to the first computing device;
mirror, by the switched port analyzer, the extracted security certificate data to an analysis port of the switch device;
output, by the switch device via the analysis port, the extracted security certificate data to a data collection and analysis system that
analyzes the extracted security certificate data with regard to security requirement compliance; and
determines whether or not one or more security compliance requirements are met by a secure communication connection.

11. The computer program product of claim 10, wherein the analysis port is one of a physical port of the switch device or a virtualized port of the switch device.

12. The computer program product of claim 10, wherein filtering the received data message comprises analyzing a traffic flow of data traffic through the switch device by implementing logic to identify patterns of data messages passed between the first computing device and the second computing device, field values in headers of data messages in the traffic flow, tags in data messages in the traffic flow, or communication identifiers corresponding to types of communications used to establish secure communication connections; and
identifying the received data message as a message that is part of the operation for establishing a secure communication connection based on results of analyzing the traffic flow of data traffic through the switch device.

13. The computer program product of claim 10, wherein the switch device is physically coupled to one of the first computing device or the second computing device.

14. The computer program product of claim 10, wherein the first computing device is a server computing device and the second computing device is a client computing device.

15. The computer program product of claim 14, wherein the received data message is part of an ingress traffic flow from the client computing device to the server computing device.

16. The computer program product of claim 14, wherein the received data message is part of one of an ingress traffic flow from the client computing device to the server computing device or an egress traffic flow from the server computing device to the client computing device, and wherein the switch device monitors both ingress traffic flows and egress traffic flows for data messages having security data.

17. The computer program product of claim 10, wherein the extracted security certificate data comprises an unencrypted security certificate, a timestamp associated with the received data message, and information regarding a sender or receiver of the received data message.

18. A switch device comprising:
a switched port analyzer;
a first port;
a second port, wherein the first port and the second port are physical ports; and
an analysis port, wherein the switch device processes data message traffic flows to and from a plurality of computing devices, and wherein the switched port analyzer comprises logic configured to:

receive, by the switched port analyzer from the first port, a data message from either a first computing device or a second computing device to be passed from the first port to the second port;

filter, by the switched port analyzer, the received data message to identify security certificate data passed in the received data message, wherein filtering the received data message comprises extracting the security certificate data from the received data message, wherein the extracted security certificate data comprises an unencrypted security certificate, and wherein the unencrypted security certificate is a security certificate of the second computing device passed in the received data message as part of a traffic flow from the second computing device to the first computing device;

mirror, by the switched port analyzer, the extracted security certificate data to the analysis port; and output, via the analysis port, the extracted security certificate data to a data collection and analysis system that analyzes the extracted security certificate data with regard to security requirement compliance; and determines whether or not one or more security compliance requirements are met by a secure communication connection.

\* \* \* \* \*